Aug. 28, 1962 W. J. BIEGANSKI 3,051,896
FREQUENCY DETECTOR
Filed May 6, 1958
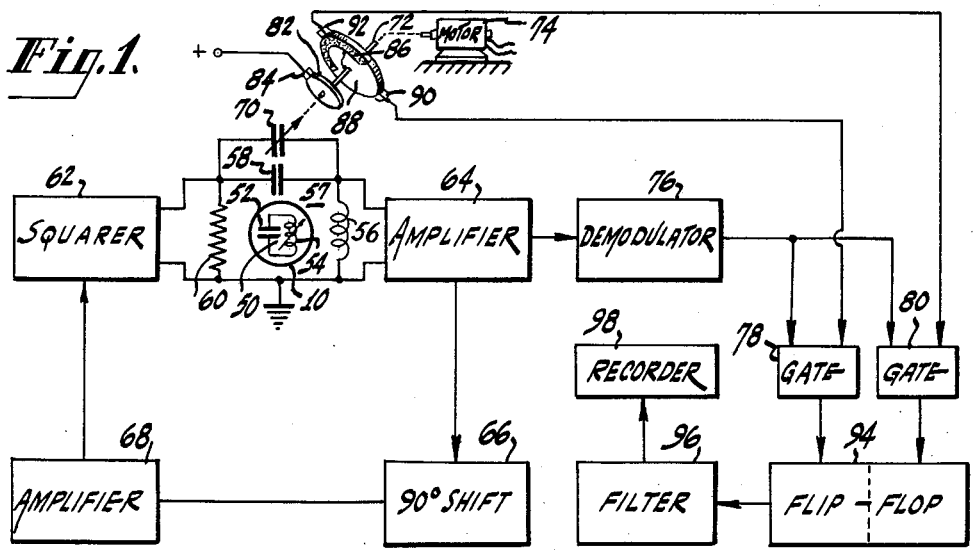
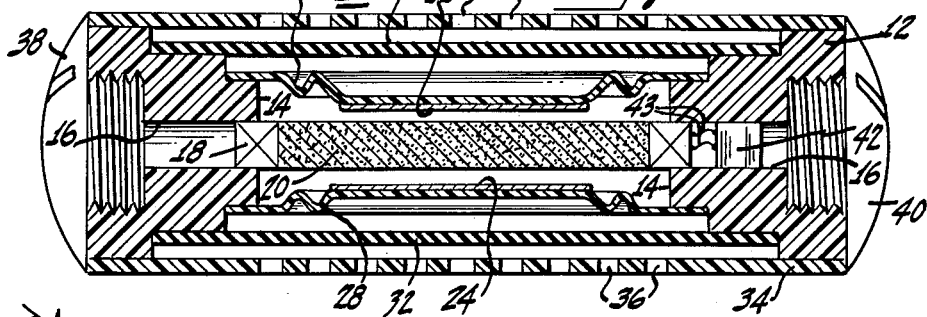
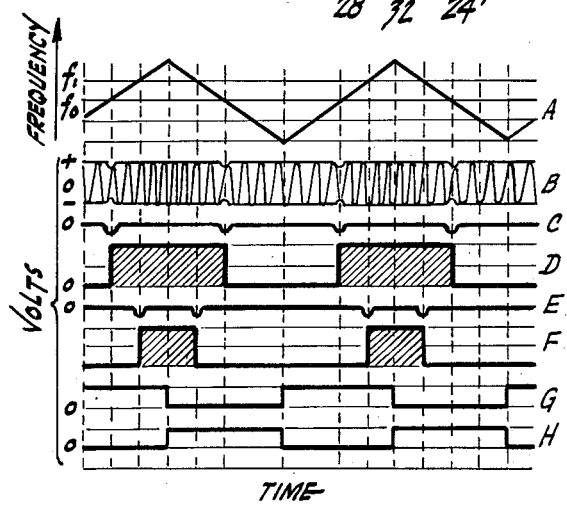
INVENTOR.
WLADYSLAW J. BIEGANSKI
BY
ATTORNEY 3,051,896
FREQUENCY DETECTOR
Wladyslaw J. Bieganski, Fords, N.J., assignor to Radio Corporation of America, a corporation of Delaware
Filed May 6, 1958, Ser. No. 733,444
2 Claims. (Cl. 324—71)

This invention relates to frequency detectors, and more particularly to apparatus for determining the frequency of a resonant circuit whose value of inductance is a function of ambient pressure. The frequency detector of the present invention is particularly useful for determining the instantaneous frequency of a resonant circuit in a transducer adapted to telemeter the intraluminal pressures of the gastrointestinal tract.

Pressure fluctuations within the stomach, small intestines and colon are important indications of the muscular activity of the gastrointestinal tract. It has been proposed to detect and record these intraluminal pressures by means of a passive radio pill. The passive radio pill is small enough to be swallowed by a living subject, and comprises means to telemeter, with the aid of the present invention, the pressure fluctuations of the gastrointestinal tract.

Briefly, the passive radio pill comprises a resonant circuit and means to vary the inductance of the resonant circuit as a function of the pressure of the medium surrounding the passive pill. A passive radio pill of this type has been described in detail and claimed by W. J. Bieganski and A. L. Witchey in a patent application, Serial No. 733,443, filed on May 6, 1958, in the U.S. Patent Office. The frequency detector of the present invention comprises means to detect the varying pressures of the gastrointestinal tract by indicating continuously the instantaneous frequency of resonance of the circuit of the passive radio pill.

Accordingly, it is an object of the present invention to provide novel and improved apparatus for determining the frequency of a resonant circuit external to the apparatus.

Another object of the present invention is to provide improved apparatus adapted to telemeter the pressures inside of different portions of the gastrointestinal tract by sampling the instantaneous frequency of resonance of the passive radio pill circuit.

In accordance with the present invention, the foregoing objects and related advantages are attained by improved apparatus adapted to detect the instantaneous resonant frequency of a resonant circuit, such as the passive pill circuit, to which it is inductively coupled. This instantaneous frequency of resonance is detected by utilizing the energy absorption effect which occurs when the frequency of oscillation of a resonant circuit in the apparatus is equal to the instantaneous frequency of resonance of the pill circuit. A loop antenna may be used to provide the inductive coupling between the pill circuit and the resonant circuit of the apparatus. A frequency scanning method is used to detect the instantaneous resonant frequency of the pill circuit. The frequency of oscillation of the frequency detector is modulated at a relatively low frequency, say 60 cycles per second. This scanning rate is sufficient to insure a system frequency response up to 10 cycles per second without difficult design problems. The amplitude of oscillations is maintained constant. Maximum absorption of energy from the frequency detector oscillating circuit will occur at the frequency equal to the instantaneous frequency of the pill circuit, and the amplitude of the frequency modulated oscillations will decrease at this frequency. The frequency modulated oscillations are amplitude detected and a train of pips is obtained. The frequency of the pill circuit may then be determined as a function of the time intervals between the pips. This can be done by utilizing the pips to trigger a gated flip-flop circuit. The direct current component of the flip-flop output waveforms will be proportional to the resonant frequency of the pill circuit, and thus to the pressure on the pill.

The novel features of the present invention, as well as the invention itself, both as to its organization and method of operation will be understood in detail when considered in connection with the accompanying drawing in which similar reference characters represent similar parts, and in which:

FIG. 1 is a schematic diagram, partly in block diagram form, of a frequency detector in accordance with the present invention;

FIG. 2 is a series of waveforms used to explain the operation of the frequency detector of FIG. 1; and FIG. 3 is a side elevational view, in cross-section of a passive radio pill whose instantaneous resonant frequency is adapted to be measured by the frequency detector of FIG. 1.

Referring now to FIG. 3, there is shown the passive radio pill 10 described and claimed in detail in the aforementioned patent application. The pill 10 will be described briefly in connection with the operation of the frequency detector of the present invention.

The pill 10 comprises an elongated body 12 of plastic formed with a through opening 14 between its ends. A slot 16 is formed within the body 12 and is disposed in coaxial alignment therewith.

A coil 18 is disposed within the slot 16 and is coaxially aligned with the through opening 14 in the body 12. A core of magnetic material 20, such as a ferrite material, is disposed within the coil 18 by any suitable means. A slab of magnetic material 22 is disposed on one side of the core 20, and a similar slab 24 is disposed on the other side of the core 20. Each of the slabs 22 and 24 is fixed to resilient members 26 and 28, respectively. The peripheries of the resilient members 26 and 28 are fixed to recessed ledges in the walls defining the through opening 14, by any suitable means.

The resilient members 26 and 28 may be protected by resilient diaphragms 30 and 32 spaced therefrom. A cover 34 formed with a plurality of openings 36, opposite the resilient diaphragms 30 and 32, fits tightly around the body 12 of the pill 10. The slot 16 may be sealed at its opposite ends by plastic screws 38 and 40. A capacitor 42 is electrically connected across the ends of the coil 18, via leads 43, to provide a resonant circuit therewith.

It will now be understood that increased pressure transmitted to the resilient members 26 and 28, through the resilient diaphragms 30 and 32, causes the slabs 22 and 24 to decrease the gap between them and the core 20, thereby increasing the inductance of the coil 18 and changing the resonance frequency of the resonant circuit comprising the coil 18 and the capacitor 42. It will also be understood that when the passive radio pill 10 is swallowed by a person, for example, the pressures of different portions of his gastrointestinal system may be telemetered by apparatus adapted to record periodically the instantaneous frequency of the resonant circuit within the pill 10.

Referring now to FIG. 1, the pill 10 is represented by a circle around a resonant circuit 50. The resonant circuit 50 comprises the capacitor 52 and a variable inductor 54. It will be understood that the variable inductor 54 represents the coil 18 together with its core 20 and the slabs 22 and 24.

The frequency detector, in FIG. 1, comprises an oscillator loop having an inductor 56 connected in series with a capacitor 58 and forming a resonant circuit 57 therewith. A small resistor 60 is connected in series with the capacitor 58 and the inductor 56. The resonant circuit 57 is excited by a constant amplitude square wave applied across the resistor 60, by means of a squarer circuit 62.

The squarer circuit 62 is a limiting amplifier having a large gain over a limited range of input voltages, and a gain approaching zero for input voltages outside of this range. A square wave is used to excite the resonant circuit because it is easier to maintain the amplitude of the square wave at a constant level.

The fundamental frequency component which is equal to the frequency of resonance of the resonant circuit 57, is magnified Q times by the resonant circuit 57, and the harmonics in the square wave are substantially eliminated. The sine wave across the inductor 56 is 90° out of phase with respect to the fundamental frequency component of the square wave. This sine wave is amplified by an amplifier 64, and its phase is shifted 90° by a phase shifting circuit 66. The output of the phase shifting circuit 66 is amplified again by an amplifier 68, and the output of the amplifier 68 is applied to the input of the squarer circuit 62, thus closing the oscillator feedback loop. It is noted that the gain of this oscillator loop is greater than 1, and, therefore, oscillations will be sustained in this loop.

The inductor 56 may actually be a loop antenna in order to provide inductive coupling between the resonant circuit 50 of the pill 10 and the resonant circuit 57 of the frequency detector.

It will now be understood that the frequency of oscillations of the frequency detector, determined by the resonant circuit 57, will be substantially near the resonant frequency of the resonant circuit 50 of the pill 10. To detect the minute energy absorption effect by the resonant circuit 50, it is necessary that the resonant circuit 57, from which energy is absorbed by the pill 10, be excited at a frequency very close to its frequency resonance. Since the amplitude of the sine wave across the inductor 56 is proportional to its effective Q, any losses, such as those due to the energy absorption by the resonant circuit 50 of the pill 10, reduces this amplitude. It is, therefore, necessary to frequency modulate the oscillator, including the resonant circuit 57, so that energy may be absorbed by the resonant circuit 50 of the pill 10 when the oscillator frequency passes through the frequency of resonance of the circuit 50.

The oscillator loop may be frequency modulated by varying the capacitance of the capacitor 58 in the resonant circuit 57. To this end, a variable capacitor 70 is connected in shunt with the capacitor 58. By using suitably shaped plates in the capacitor 70, the frequency of the resonant circuit 57 may be modulated periodically and regularly through a range of frequencies, according to the triangular waveform A shown in FIG. 2. The rotor plates of the capacitor 70 are mechanically coupled to the shaft 72 of a motor 74. It will now be understood that as the rotor of the capacitor 70 is rotated at a relatively low frequency, say 60 cycles per second, the frequency of the resonant circuit 57 may be varied periodically, for example, between 390 kilocycles per second and 430 kilocycles per second. The frequency modulated wave will now have the form illustrated by the waveform B in FIG. 2.

Means are provided to amplitude demodulate the frequency modulated output from the amplifier 64, of the oscillator loop, to obtain a pip every time energy is absorbed by the resonant circuit 50 of the pill 10. To this end, an amplitude demodulator 76 has its input connected to an output of the amplifier 64.

The operation of the frequency detector, shown in FIG. 1, will now be explained. The oscillations produced by the oscillation loop, comprising the squarer circuit 62, the resonant circuit 57, the amplifier 64, the phase shifting circuit 66, and the amplifier 68, scan a range of predetermined frequencies including the frequency of the resonant circuit 50 of the pill 10. Let it be assumed, for example, that the instantaneous frequency of the resonant circuit 50 is $f_0$. It will, therefore, be seen from waveforms A and B in FIG. 2 that energy will be absorbed from the resonant circuit 57 every time the frequency modulated oscillations sweep through the frequency $f_0$. Thus, energy will be absorbed by the resonant circuit 50 twice during each cycle of frequency modulation. The output of the demodulator 76 will, therefore, be a series of pairs of pips, such as two successive negative-going pips, as shown by the waveform C in FIG. 2, for each cycle of frequency modulation. The time interval between successive pips will be a function of the frequency of the resonant circuit 50, as will be hereinafter explained.

If the instantaneous resonant frequency of the resonant circuit 50 of the pill 10 were to increase to $f_1$, due to a change in the ambient pressure about the pill 10, absorption of energy would occur at the frequency $f_1$, and the negative-going pips at the output of the demodulator 76 would be shifted in time, as shown by the waveform E of FIG. 2.

A visual indication of the instantaneous frequency being telemetered by the pill 10 may be had by displaying the signals obtained from the output of the amplitude demodulator 76 on a calibrated oscilloscope. Looking at the waveforms C and E in FIG. 2, it is seen that the time intervals between successive signals during each cycle of frequency modulation are a function of the resonant frequency of the pill circuit 50, and hence the ambient pressure of the pill 10.

Where a permanent record of the pressures inside the gastrointestinal tract, for example, is desired, the signals from the demodulator 76 may be treated in the following manner. The output of the demodulator 76 is connected to the inputs of gates 78 and 80, of conventional design. The gates 78 and 80, normally closed, may be opened by applying a positive voltage to them. To this end, a source of positive potential is connected to an electrically conducting disc 82 through a brush 84. The disc 82 is fixed to the shaft 72, and the shaft 72 is electrically connected to an arcuate conducting member 86. The arcuate conducting member 86 is fixed to the periphery of a non-conducting disc 88 which, in turn, is fixed to the shaft 72 to rotate therewith. A fixed brush 90 makes contact with the periphery of the non-conducting disc 88 for 180° and with the conducting member 86 for 180°. A brush 92, fixed diametrically opposite to the brush 90, also contacts the periphery of the non-conducting disc 88 and the conducting member 86 when the shaft 72 is rotated.

The brush 90 is connected to the gate 78, and the brush 92 is connected to the gate 80. It will now be understood that with this arrangement the gates 78 and 80 are opened alternately once during each cycle of frequency modulation of the resonant circuit 57.

The waveforms G and H indicate that the gates 78 and 80 are opened and closed alternately with respect to each other once during each cycle of frequency modulation, and with a phase relationship to the frequency modulated oscillations, as indicated in FIG. 2. Each of the gates 78 and 80 are connected to a separate input of a bistable flip-flop circuit 94. The flip-flop circuit 94 may be a conventional bistable multivibrator wherein a signal pip applied to one input results in initiating a square wave output whose duration is terminated by a subsequent signal pip applied to a second input. Looking at the waveform D in FIG. 2, it can be seen that the first signal pip during each cycle of frequency modulation will cause the flip-flop circuit 94 to form a square wave that is terminated by the second signal pip in the cycle.

The D.-C. component of the flip-flop waveform D in FIG. 2 is proportional to the resonant frequency of the tuned circuit 50 of the pill 10, and thus to the pressure on the pill 10. Where the pressure has been increased on the pill 10, the instantaneous frequency of the resonant circuit is increased, say to $f_1$, for example. The signals from the demodulator 76, that is, the negative-going pips as shown by the waveform E in FIG. 2, will now cause the output of the flip-flop circuit 94 to provide square waves with a smaller D.-C. component, as shown by the waveform F in FIG. 2.

The output of the flip-flop circuit 94 is connected to a low pass filter 96 to obtain the D.-C. components of the aforementioned flip-flop waveforms, and the output of the filter 96 is applied to the input of a recorder 98 for obtaining a continuous and permanent record of the pressures on the pill 10. The recorder 98 may be of any suitable type known in the art, such as an ink recorder.

Thus, there has been shown and described, in accordance with the objects of the present invention, a frequency detector adapted to monitor the frequency of a resonant circuit in a pressure transducer. By frequency modulating an oscillator with a relatively low frequency alternating current waveform, over a range of frequencies, including the one at which absorption of energy from the frequency detector occurs, a pair of signal pips is detected during each cycle of frequency modulation. The time interval between each of the signal pips in each pair of pips is a function of the resonant frequency of the pill circuit and of the monitored pressure.

What is claimed is:

1. A system for measuring the pressures within portions of a body, said system comprising, in combination, a passive pill adapted to be moved to said portions of said body, said pill comprising a resonant circuit and means to change the frequency of said resonant circuit in response to the ambient pressure about said pill, means to produce frequency modulated oscillations of substantially constant amplitude that sweep through a range of frequencies periodically, said range of frequencies including frequencies that can be produced by said resonant circuit, said means to produce frequency modulated oscillations comprising means to deliver energy to said resonant circuit when coupled thereto and when said oscillations sweep through the frequency of said resonant circuit, means to demodulate said oscillations to obtain a signal when energy is absorbed by said resonant circuit, means including a bistable flip-flop circuit having an output and two inputs responsive to said signals, means synchronized with said means to produce frequency modulated oscillations to gate said signals alternately to said two inputs, and means connected to said output of said flip-flop circuit to indicate said pressures as a function of the time intervals between said signals.

2. A system for measuring the pressures within different portions of a body, said system comprising, in combination, a passive pill adapted to be moved to said portions of said body, said pill comprising a resonant circuit and means to change the frequency of said resonant circuit in response to the ambient pressures about said pill, means to produce frequency modulated oscillations of substantially constant amplitude that sweep through a range of frequencies periodically, said range of frequencies including frequencies that can be produced by said resonant circuit, said means to produce frequency modulated oscillations comprising means to deliver energy to said resonant circuit when coupled thereto and when said oscillations sweep through the frequency of said resonant circuit, means to demodulate said oscillations to obtain a signal when energy is absorbed by said resonant circuit whereby to obtain two signals during each cycle of frequency modulation, a bistable flip-flop circuit having two inputs and an output, means including a separate gate for each of said two signals to apply a separate one of said two signals alternately during each of said cycles to a separate one of said two inputs respectively, each of said gates being controlled by said means to produce frequency modulated oscillations at a predetermined phase relationship to said oscillations, indicating means, and means to connect said output of said flip-flop circuit to said indicating means to indicate said ambient pressure as a function of the time intervals between said signals.

References Cited in the file of this patent

UNITED STATES PATENTS

| | | |
|---|---|---|
| 1,897,204 | Loewe | Feb. 14, 1933 |
| 2,252,058 | Bond | Aug. 12, 1941 |
| 2,352,011 | Rosa et al. | June 20, 1944 |
| 2,380,791 | Rosencrans | July 31, 1945 |
| 2,424,249 | Miller | July 22, 1947 |
| 2,439,047 | Grinstead et al. | Apr. 6, 1948 |
| 2,440,886 | Bach | May 4, 1948 |
| 2,514,369 | Buehler | July 11, 1950 |
| 2,586,880 | Steinhauser | Feb. 26, 1952 |
| 2,592,235 | Bischoff | Apr. 8, 1952 |
| 2,594,535 | Bertram | Apr. 29, 1952 |
| 2,725,548 | Harris | Nov. 29, 1955 |
| 2,790,145 | Bartelink | Apr. 23, 1957 |
| 2,818,732 | Bennett | Jan. 7, 1958 |
| 2,834,338 | Carson | May 13, 1958 |
| 2,958,781 | Marchal et al. | Nov. 1, 1960 |

OTHER REFERENCES

"Frequency Measurements at U.H.F.," article in Radio News, September 1946; pages 50–52.

"Applications of the Grid-Dip Oscillator," article in CQ, January 1949; pages 30–34.

"High Sensitive Capacitance Pickup for Heart Sounds and Murmurs," article in I.R.E. Transactions on Medical Electronics, 1957, pages 35–37.

"Endoradiosonde," article in Nature, vol. 179, June 15, 1957; page 1239.

"A PH Radiosonde," Lancet, June 15, 1957; page 1224.

"Pressure Sensitive Telemetering Capsule," Science, Nov. 8, 1957; pages 975–976.

"Pill Telemeters from Digestive Tract," Electronics, January 3, 1958; pages 51–53.